United States Patent
Ikeda et al.

(10) Patent No.: US 6,449,245 B1
(45) Date of Patent: Sep. 10, 2002

(54) SIGNAL RECEIVING APPARATUS AND METHOD AND PROVIDING MEDIUM

(75) Inventors: Yasunari Ikeda; Takahiro Okada, both of Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/403,367

(22) PCT Filed: Feb. 19, 1999

(86) PCT No.: PCT/JP00/00734

§ 371 (c)(1),
(2), (4) Date: Dec. 20, 1999

(87) PCT Pub. No.: WO99/43114

PCT Pub. Date: Aug. 26, 1998

(30) Foreign Application Priority Data

Feb. 20, 1998 (JP) .......................................... 10-038309

(51) Int. Cl.[7] .............................................. H04J 11/00
(52) U.S. Cl. ........................................ 370/208; 375/229
(58) Field of Search ................................ 370/203, 208, 370/337, 347; 375/360, 130, 229, 344, 346, 348, 350

(56) References Cited

U.S. PATENT DOCUMENTS

| | | | |
|---|---|---|---|
| 5,471,464 A | * | 11/1995 | Ikeda |
| 5,796,814 A | | 8/1998 | Brajal et al. ..................... 7/30 |
| 5,802,117 A | * | 9/1998 | Shosh ......................... 375/344 |
| 5,920,598 A | * | 7/1999 | Hyakudai et al. ........... 375/316 |
| 6,215,819 B1 | * | 4/2001 | Hyakudai et al. ........... 375/240 |
| 2001/0015954 A1 | * | 8/2001 | Kuwabara et al. .......... 370/206 |

FOREIGN PATENT DOCUMENTS

| | | |
|---|---|---|
| EP | 0 734 133 A1 | 9/1996 |
| FR | 2 732 178 | 9/1996 |
| JP | 8-340315 | 12/1996 |
| JP | 9-312582 | 12/1997 |
| JP | 10-327122 | 12/1998 |

\* cited by examiner

*Primary Examiner*—Douglas Olms
*Assistant Examiner*—Ken Vanderpuye
(74) *Attorney, Agent, or Firm*—Lerner, David, Littenberg, Krumholz & Mentlik, LLP

(57) ABSTRACT

An intermediate frequency signal of an OFDM signal received by a tuner (2) is multiplied by a carrier wave by a multiplier (3) and a multiplier (4) to thereby generate an OFDM signal in a base band. The OFDM signal in the base band is FFT processed by an FFT circuit (5) and a resultant signal is outputted to a dividing circuit (10) and a pilot signal extracting circuit (8) in an equalizing circuit (13). A pilot signal extracted by the pilot signal extracting circuit (8) is supplied to an interpolating filter (9) and subjected to an interpolating process. An amplitude component and a phase component in the pilot signal are supplied to the dividing circuit (10). The dividing circuit (10) divides the signal input from the FFT circuit (5) by the amplitude and phase supplied from the interpolating filter (9) and a resultant signal is output to a demapping circuit (11). An FFT window circuit (6) detects the length of the guard interval from outputs of the multipliers (3) and (4) and outputs the detection signal to a control circuit (21). The control circuit (21) controls the band width of the interpolating filter (9) in accordance with the length of the input guard interval, thereby suppressing deterioration in the equalizing characteristics by noises.

6 Claims, 11 Drawing Sheets

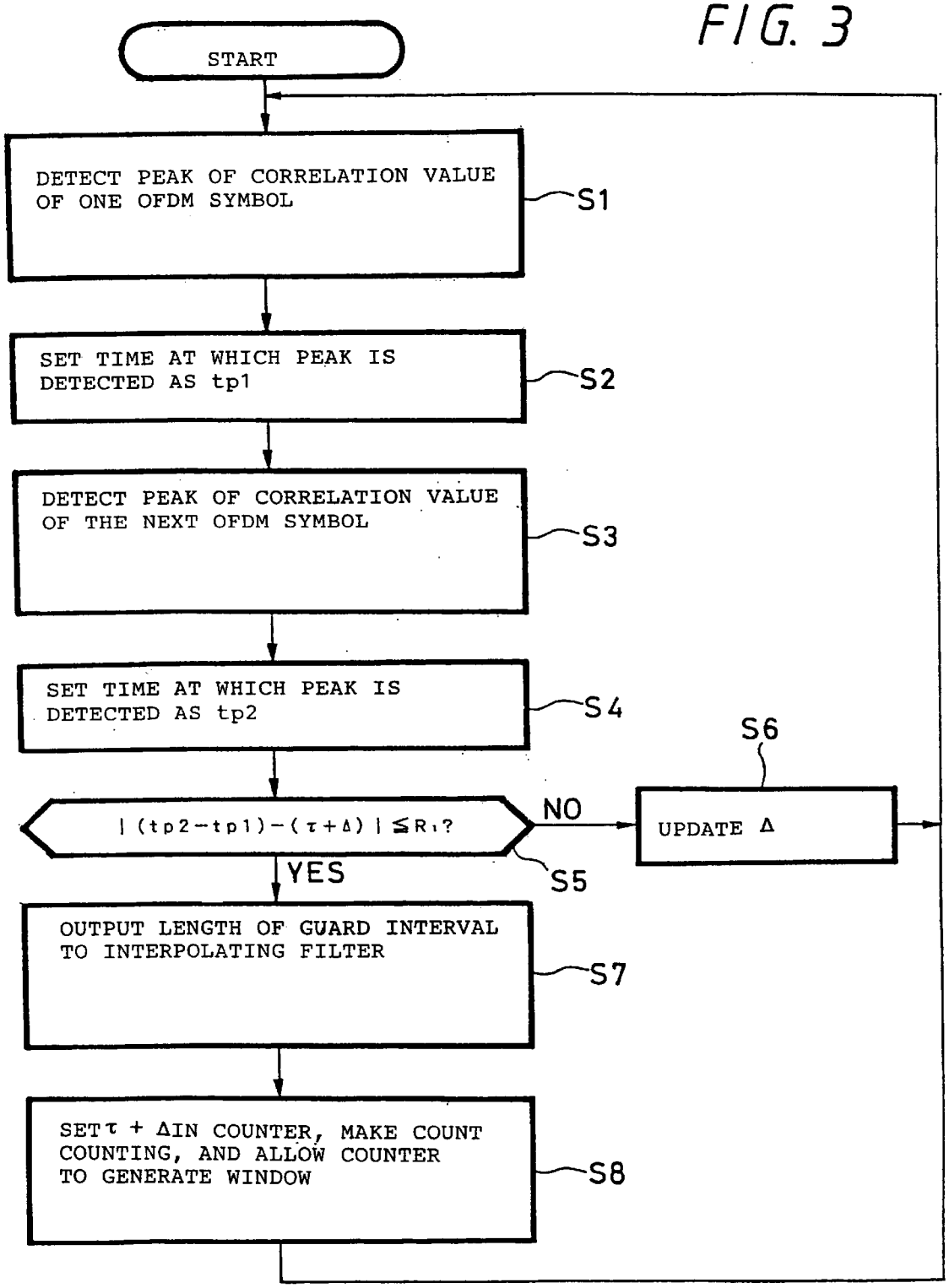

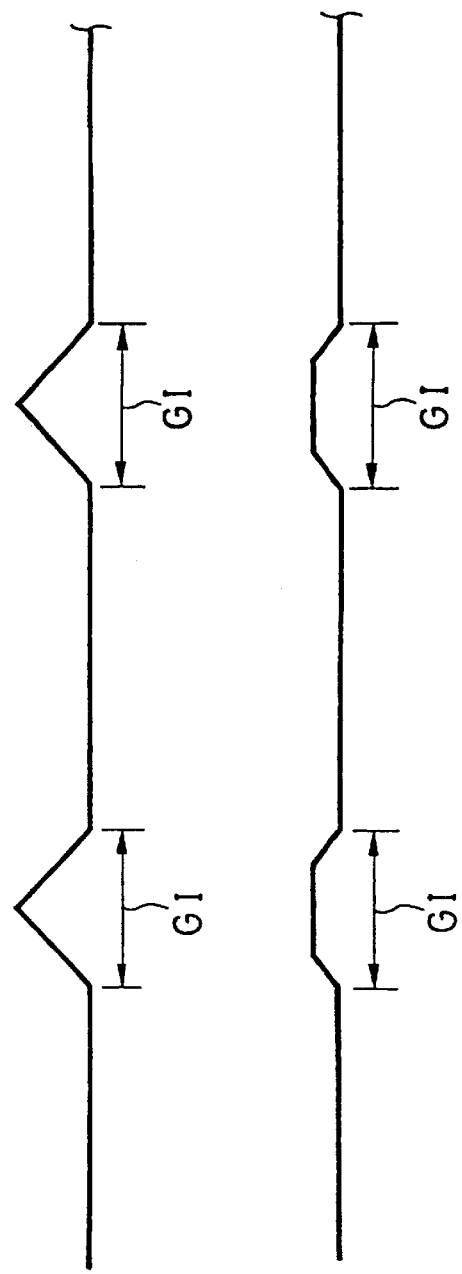

SIGNAL RECEIVING APPARATUS AND METHOD AND PROVIDING MEDIUM

BACKGROUND OF THE INVENTION

The present invention relates to a signal receiving apparatus and method and a providing medium.

As a digital broadcast transmitting system using a ground wave, recently, attention is being paid to an OFDM (Orthogonal Frequency Division Multiplex) modulating system. As a service using the OFDM modulating system, in Europe, a radio service using the Eureka 147 DAB (Digital Audio Broadcasting) system has already been started. With respect to a television broadcasting as well, in Europe, the DVB (Digital Video Broadcasting)-T system has already been developed and standardization of the television broadcasting is recommended by the ITU-R (International Telecommunication Union-Recommendation).

In the Eureka 147 DAB system of which service has already been started, since a main service is intended for a mobile unit audio signal, the π/4 offset differential QPSK (Quadrature Phase Shift Keying) is used for each of carrier waves of the OFDM. Since the system is intended for a mobile unit, resistance to fading is a necessary condition. The system is employed since there is no information in the amplitude direction and it is unnecessary to reproduce an absolute phase.

On the other hand, in the television broadcasting, different from broadcasting service of which target is sound, it is not so much necessary to correspond to be adapted to a mobile unit. Instead, since it is necessary to transmit mainly video information of a large information amount, a high transmission speed is required. Specifically, in the audio service for the mobile unit, very reliable transmission even in hostile environments is demanded. On the contrary, in the television broadcasting service, high speed transmission is demanded. From such a background, in the DVB-T system intended for the television broadcasting service, it is proposed to use a modulating system such as QPSK, 64 QAM, or 16 QAM for modulation of each of carrier waves of the OFDM.

In the ground wave transmission, generally, a multipath exists and the frequency characteristics of a reception signal are distorted by the multipath. It is therefore an important subject to reduce the influence of the multipath. In the OFDM system, therefore, a signal of a copy of a part of a signal to be inherently transmitted is added as a guard interval. By adding the guard interval, with respect to a multipath shorter than the guard interval, a proper signal process is performed on the reception side, thereby enabling the influence of the multipath to be eliminated.

In the OFDM modulating system such as the DVB-T system using modulation of a QAM system as a system of modulating each of carrier waves, when a distortion caused in the multipath occurs, the amplitude and phase of each carrier wave become different from those on the transmission side. It is therefore necessary to equalize (correct) a signal distorted by the multipath so that the amplitude and phase are unchanged. In the OFDM system, the OFDM modulation is carried out by performing the FFT (Fast Fourier Transform) on the reception side. By dispersing pilot signals in transmission signals and by monitoring the amplitude and the phase of the pilot signal on the reception side, the characteristics of a transmission path are estimated and a reception signal is equalized according to the estimated characteristics of the transmission path.

In the DVB-T system, it is proposed that the pilot signals are inserted in a pattern as shown in FIG. 9. In the same figure, the abscissa axis shows a frequency f and the ordinate axis represents a time t. As illustrated in the same figure, in the example, a carrier wave signal for pilot (shown by a black circle) is inserted per 12 carrier waves of one OFDM symbol (its frequency is shown by f0) and the insertion position of the carrier wave signal for pilot is shifted by three carrier waves at every OFDM symbol. A blank circle shows a carrier wave signal for information. Also, a tg denotes a guard interval.

The pilot signals arranged discretely in both the time and frequency directions shown in FIG. 9 were subjected to two-dimensional Fourier transform, the structure of sampling lattice points was examined, and the transmission band width was checked. The result is as shown in FIG. 10. From the same figure, it is understood that the transmission band width when there is no fluctuation in the time direction in the transmission path is within a time corresponding to an interval of three carrier waves. In other words, since there is the transmission band width of ⅓ of effective time of the OFDM symbol (duration of the OFDM symbol except for the guard interval), the pilot signal pattern in the DVB-T system has equalizing capability for the time within ⅓ of the OFDM effective symbol length.

FIG. 11 shows an example of the construction of a conventional signal receiving apparatus for estimating the transmission path characteristics from such a pilot signal and equalizing (correcting) a reception signal. A tuner 2 converts a signal received by an antenna 1 into an intermediate frequency (IF signal) which is outputted to multipliers 3 and 4. Carrier waves whose phases are different from each other by 90 degrees generated by a carrier wave generating circuit 7 are supplied to the multipliers 3 and 4. Each of the multipliers 3 and 4 multiplies the input intermediate frequency signal by the carrier wave, converts the signal into an OFDM signal in a base band, and outputs a resultant signal to an FFT circuit 5. The FFT circuit 5 performs an FFT process on the input signal, thereby OFDM demodulating the OFDM signal in the base band.

An FFT window circuit 6 generates a window as a reference of start of the FFT operation of the FFT circuit 5 by using the correlation of the guard intervals of the OFDM signals from the OFDM signals in the base band outputted from the multipliers 3 and 4 and outputs the window to the FFT circuit 5. The carrier wave generating circuit 7 generates carrier waves whose phases are different from each other by 90 degrees from an output of the FTT window circuit 6 and outputs them to the multipliers 3 and 4.

Each of the carrier waves of the OFDM signal outputted from the FFT circuit 5 is supplied to a dividing circuit 10 and a pilot signal extracting circuit 8 which construct an equalizing circuit 13. The pilot signal extracting circuit 8 extracts the pilot signal from the input signal and outputs it to an interpolating filter 9. The interpolating filter 9 performs an interpolating process on the input pilot signal, thereby estimating the transmission path characteristics of each of the carrier waves of the OFDM signal, and outputs the estimation result to the dividing circuit 10. The dividing circuit 10 divides each of the carrier waves of the OFDM signal input from the FFT circuit 5 by the transmission path characteristics input from the interpolating filter 9, removes the distortion occurred in the transmission path, and outputs a resultant to a demapping circuit 11. The demapping circuit 11 restores the transmission information from a signal point of the signal input from the dividing circuit 10. When an error correcting circuit using a convolutional code or the like exists at the post stage of the demapping circuit 11, a metric to be supplied to a Viterbi decoder is generated by the demapping circuit 11.

A TPS detecting circuit 12 extracts a transfer control signal called a TPS (Transfer Parameter Signal) from an output of the FFT circuit 5. The transfer control signal includes a coding ratio of the convolutional code, a system of modulating the OFDM carrier wave, guard interval information and the like in the next super frame (one super frame consists of eight frames). The TPS detecting circuit 12 controls each of the circuits on the basis of the extracted transfer control signal. For example, the demapping circuit 11 is controlled on the basis of the modulating system of the OFDM carrier wave included in the transfer control signal so as to execute the demapping process corresponding to the modulating system such as QPSK, 16 QAM, or 64 QAM.

The operation will now be described. The tuner 2 converts a signal received by the antenna 1 into an intermediate frequency signal and outputs a resultant signal to the multipliers 3 and 4. Carrier waves whose phases are different from each other by 90 degrees generated by the carrier wave generating circuit 7 are supplied to the multipliers 3 and 4. The transfer wave is generated from the outputs of the multipliers 3 and 4 in correspondence with a phase error detected by using the correlation of the guard interval by the FFT window circuit 6. Each of the multipliers 3 and 4 multiplies the intermediate frequency signal of the OFDM signal input from the tuner 2 by the carrier wave supplied from the carrier wave generating circuit 7 to thereby generate the OFDM signal in the base band, and outputs the resultant signal to the FFT circuit 5. The FFT circuit 5 performs the FFT process on the input OFDM signal in the base band to thereby demodulate the OFDM signal.

The pilot signal extracting circuit 8 extracts the pilot signal from the output of the FFT circuit 5 and outputs it to the interpolating filter 9. The interpolating filter 9 performs the interpolating process on the pilot signal input from the pilot signal extracting circuit 8, thereby detecting the amplitude and the phase component of each carrier wave as transfer path characteristics of the carrier wave and outputs them to the dividing circuit 10. The dividing circuit 10 divides the demodulated signal input from the FFT circuit 5 by the amplitude and the phase supplied from the interpolating filter 9 to thereby eliminate a distorted component caused by the transfer path characteristics. For example, when the amplitude of the carrier wave input from the FFT circuit 5 is ½ of the original amplitude, ½ is supplied as amplitude information from the interpolating filter 9. When the dividing circuit 10 divides the amplitude of the signal input from the FFT circuit 5 by the amplitude information of the interpolating filter 9, a signal having the original amplitude 1 (=(½)/(½)) can be obtained. Similarly, with respect to the phase as well, by performing a complex calculation, a signal having the original phase can be obtained.

The demapping circuit 11 demaps the signal point of the signal outputted from the dividing circuit 10. To this end, the TPS detecting circuit 12 detects the transfer control signal included in the signal outputted from the FFT circuit 5, detects information regarding the modulation system of the OFDM signal from the transfer control signal, and outputs the detection result to the demapping circuit 11. The demapping circuit 11 performs the demapping process in accordance with the modulation system information from the TPS detecting circuit 12 and outputs the processing result.

By the way, in the DVB-T system, as a ratio of the length of the guard interval to the length of the effective symbol length, four kinds of ratios 1/4, 1/8, 1/16, and 1/32 are defined. The guard interval is set (fixed) to the band width of 1/4 of the maximum length so that the interpolating filter 9 can execute the equalizing process even when a signal of the guard interval having any of the four kinds of lengths is received.

As described above, since in the conventional apparatus the band width of the interpolating filter 9 is fixed to 1/4 at which the guard interval is the,longest, when the OFDM signal whose guard interval is shorter than that is received, the signal component band which is originally unnecessary is processed, so that noises increase in association with the signal. There is a problem such that a more accurate transfer path estimating process cannot be realized by the influence of noises.

The present invention has been achieved in consideration of such conditions and is to propose a signal receiving apparatus and a method and a providing medium in which an influence of noises in a transfer path can be more effectively suppressed.

SUMMARY OF THE INVENTION

A signal receiving apparatus of the present invention is characterized by comprising a receiving means for receiving a signal transferred in the OFDM system; a demodulating means for demodulating the OFDM signal received by the receiving means; an equalizing means for equalizing the signal demodulated by the demodulating means; a detecting means for detecting the length of the guard interval of the OFDM signal received by the receiving means; and a control means for controlling the equalizing means in accordance with the detection result of the detecting means.

A signal receiving method of the present invention is characterized by comprising a receiving step of receiving a signal transferred in the OFDM system; a demodulating step of demodulating the OFDM signal received in the receiving step; an equalizing step of equalizing the signal demodulated in the demodulating step; a detecting step of detecting the length of the guard interval of the OFDM signal received in the receiving step; and a control step of controlling an equalizing process in the equalizing step in accordance with the detection result in the detecting step.

A providing medium of the present invention is characterized by providing a program which can be read by a computer which allows a signal receiving apparatus for receiving a signal transferred in an OFDM system to execute a process comprising a receiving step of receiving a signal transferred in the OFDM system; a demodulating step of demodulating the OFDM signal received in the receiving step; an equalizing step of equalizing the signal demodulated in the demodulating step; a detecting step of detecting the length of the guard interval of the OFDM signal received in the receiving step; and a control step of controlling an equalizing process in the equalizing step in accordance with the detection result in the detecting step.

BRIEF DESCRIPTION OF DRAWINGS

FIG. 3 is a flowchart for explaining the operation of the FFT window circuit of FIG. 2.

FIGS. 5A and 5B are diagrams for explaining the calculation result of the complex correlation calculating circuit shown in FIG. 2.

DETAILED DESCRIPTION

Figure 1:
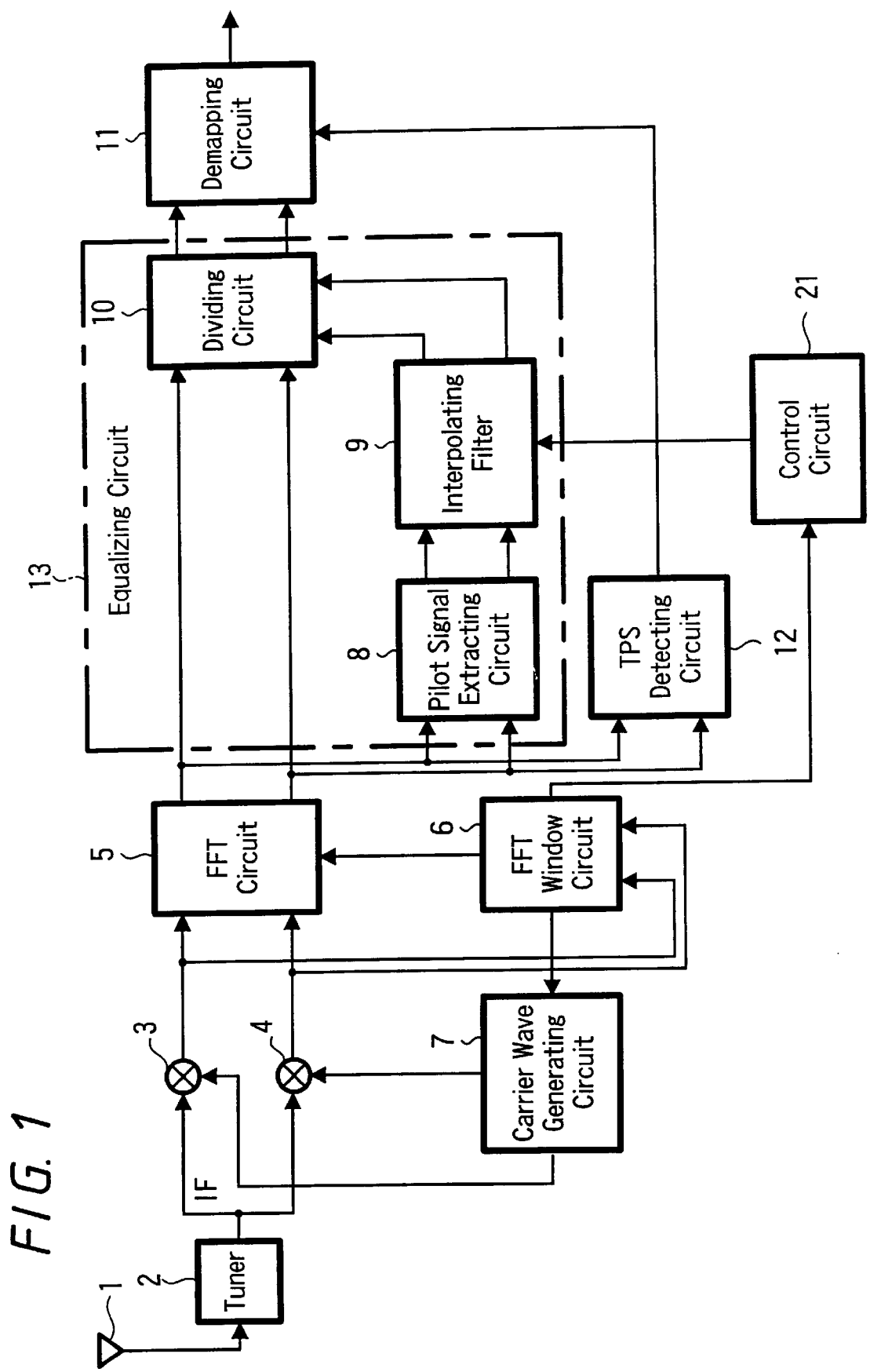
FIG. 1 is a block diagram showing an example of a first embodiment of a signal receiving apparatus of the present invention.

Embodiments of the present invention will be described hereinbelow with reference to the drawings. FIG. 1 is a block diagram showing a construction example of a signal receiving apparatus to which the present invention is applied. Parts corresponding to those in FIG. 11 are designated by the same reference numerals and their description is omitted as appropriate.

Figure 11:
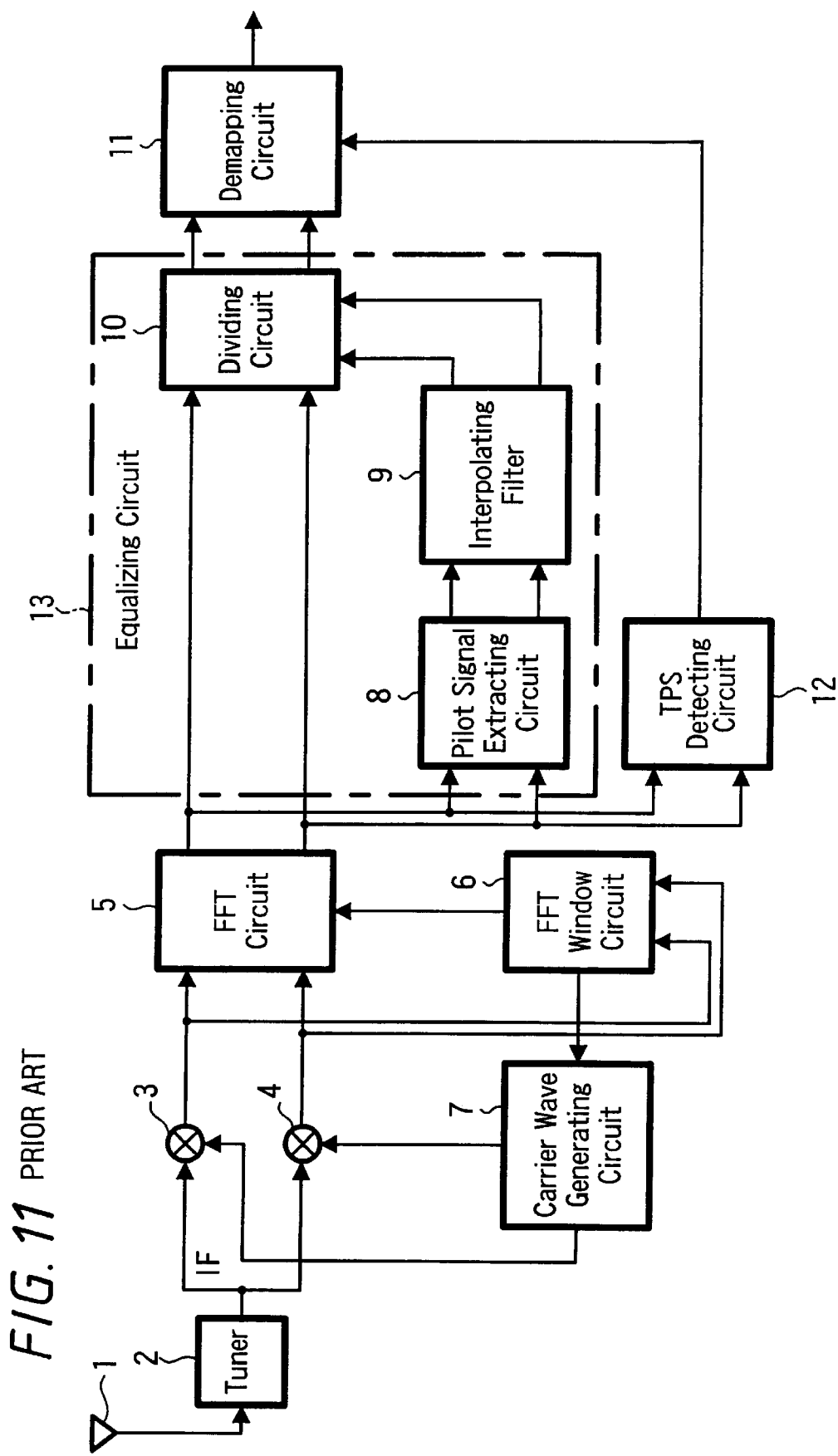
FIG. 11 is a block diagram showing an example of a conventional signal receiving apparatus of the prior art.

Specifically, the signal receiving apparatus of FIG. 1 has basically the construction similar to that of the signal receiving apparatus illustrated in FIG. 11 but the following point is different from the example of FIG. 11. The FFT window circuit 6 detects the length of the guard interval and outputs the detection signal to a control circuit 21 and the control circuit 21 controls the interpolating filter 9 in accordance with a signal from the FFT window circuit 6. The other construction is similar to that of the case in FIG. 11.

Figure 2:
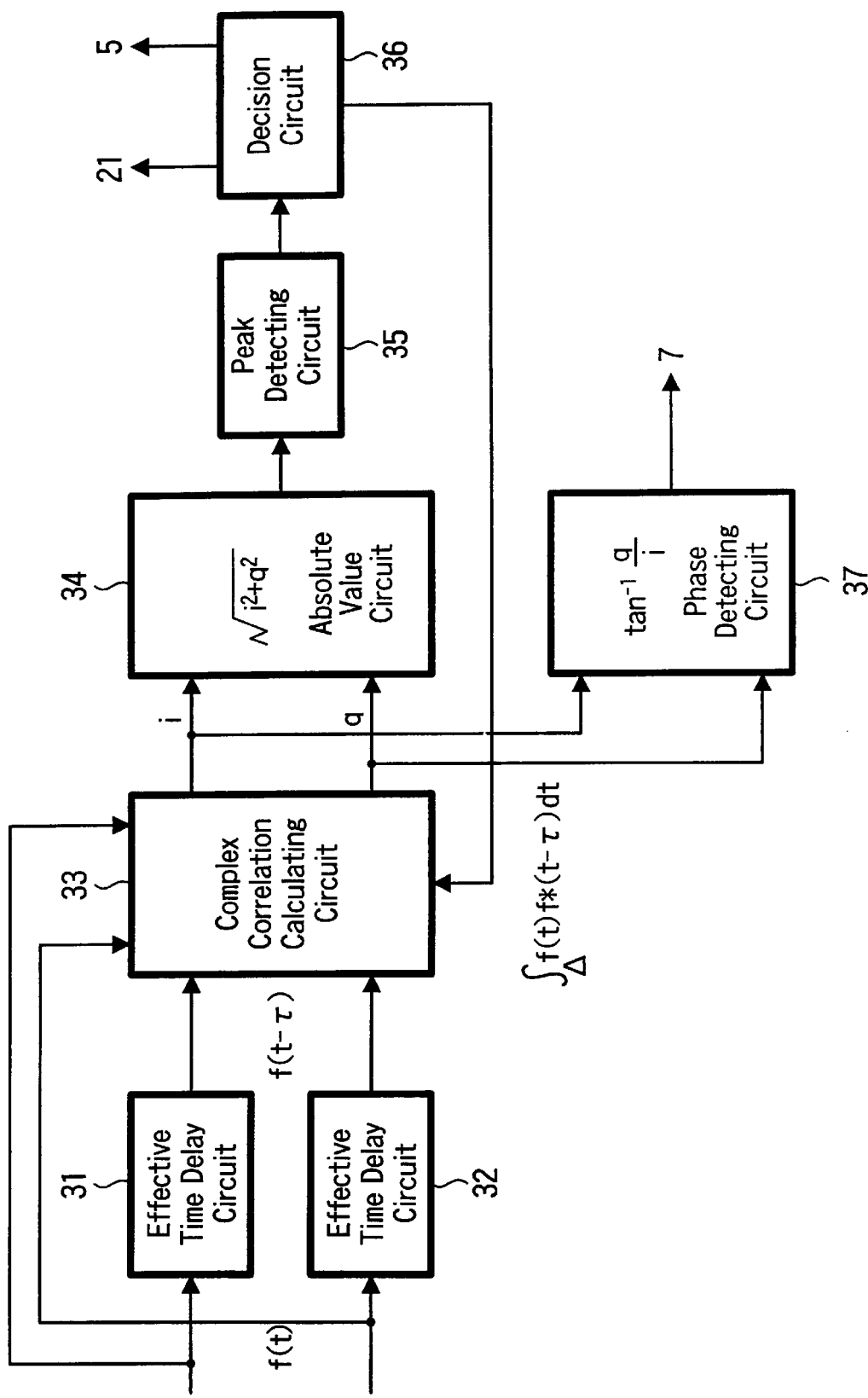
FIG. 2 is a block diagram showing an example of the FFT window circuit shown in FIG. 1.

FIG. 2 shows a construction example of the FFT window circuit 6 in FIG. 1. Outputs of the multipliers 3 and 4 are delayed by effective time delay circuits 31 and 32, respectively, only by a time τ corresponding to the effective symbol length. After that, the resultant signals are supplied to a complex correlation calculating circuit 33. The OFDM signals in the base band outputted from the multipliers 3 and 4 are also input as they are to the complex correlation calculating circuit 33. When it is assumed that a signal input from the multiplier 3 is f(t) and a signal input from the effective time delay circuit 31 is f(t−τ), the complex correlation calculating circuit 33 calculates the correlation i of the two signals by the following expression.

$$\int_\Delta f(t) f^*(t-\tau) dt \tag{1}$$

A similar process is performed to the output of the multiplier 4 and a correlation q is outputted. Where f(t) and f*(t) have the relation of a complex conjugate.

Outputs i and q of the complex correlation calculating circuit 33 are supplied to an absolute value circuit 34 and a phase detecting circuit 37. The absolute value circuit 34 derives an absolute value of the input signals i and q by multiplication of $(i^2+q^2)^{1/2}$. An output of the absolute value circuit 34 is supplied to a peak detecting circuit 35. The peak detecting circuit 35 compares the absolute value input from the absolute value circuit 34 with a predetermined reference value. When an absolute value which is equal to or larger than the reference value is obtained, the peak detecting circuit determines that a predetermined correlation is obtained and outputs a detection signal to a decision circuit 36.

The decision circuit 36 executes a process shown in the flowchart of FIG. 3, outputs an output of a counter built in the FFT circuit 5 as a reference pulse (window) which is a reference of a timing at which the FFT circuit 5 starts the FFT operation to the FFT circuit 5, detects the guard interval length, and outputs the detection result to the control circuit 21. The decision circuit 36 executes the processes shown in the flowchart of FIG. 3 and outputs a signal to update the period of integration Δ in the correlation calculation to the complex correlation calculating circuit 33.

The phase detecting circuit 37 detects the phase difference between the signals i and q input from the complex correlation calculating circuit 33 as a $\tan^{-1}(q/i)$ and outputs the detected phase error to the carrier wave generating circuit 7.

Figures 4A, 4B:
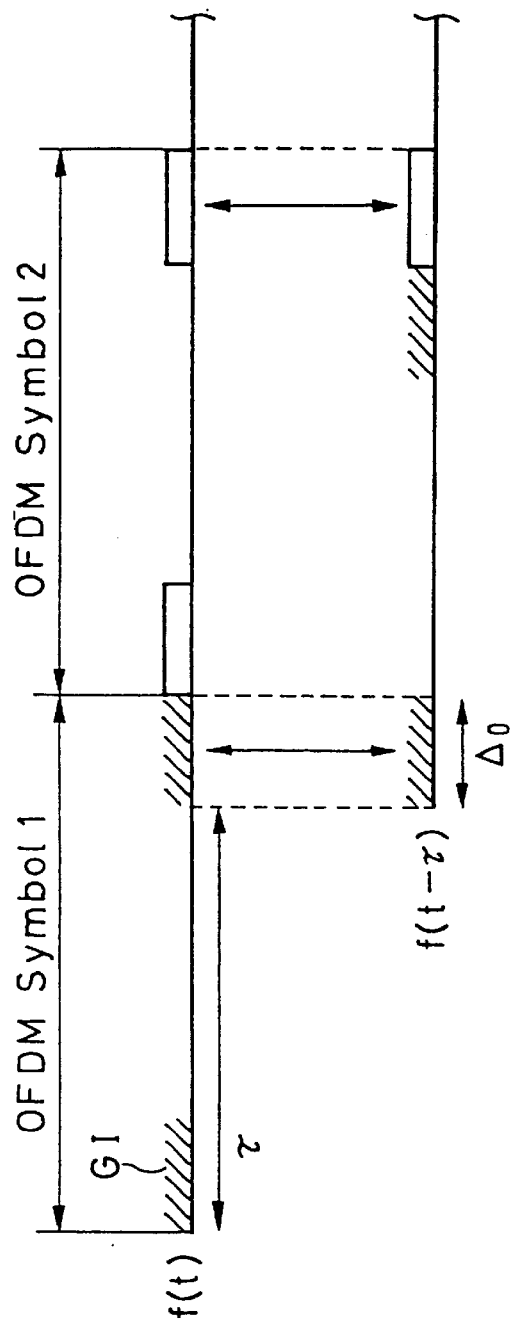
FIGS. 4A and 4B are diagrams for explaining an OFDM signal input to the complex correlation calculating circuit shown in FIG. 2.

An operation of the embodiment of FIG. 1 different from that of the conventional embodiment will be described mainly by the operation of the FFT window circuit 6 with reference to the flowchart of FIG. 3. First in step S1, a process for detecting the peak of a correlation value of a single OFDM symbol is executed. That is, to the complex correlation calculating circuit 33, the symbols f(t) shown in FIG. 4A are input from the multipliers 3 and 4 and the symbols f(t−τ) shown in FIG. 4B are input via the effective time delay circuits 31 and 32. The symbol f(t−τ) is delayed from the symbol f(t) only by the time τ corresponding to the effective symbol length. As illustrated in FIG. 4, the guard interval of the symbol f(t) and that of the symbol f(t−τ) are input to the complex correlation calculating circuit 33 at the same timing.

The complex correlation calculating circuit 33 calculates the complex correlation of the symbols f(t) and f(t−τ) in accordance with the expression (1).

The operation is executed between the signal outputted from the multiplier 3 and the signal outputted from the effective time delay circuit 31 and between the signal outputted from the multiplier 4 and the signal outputted from the effective time delay circuit 32. The former calculation result is outputted as i and the latter calculation result is outputted as q.

The absolute value circuit 34 calculates the square root of the sum of the signal i squared and the signal q squared as an absolute value and outputs the resultant value to the peak detecting circuit 35.

When the period Δ in which the complex correlation calculating circuit 33 performs the integrating process in the Expression (1) is equal to the period $\Delta_0$ of the guard interval GI as shown in FIG. 4, an absolute value outputted from the absolute value circuit 34 becomes a large value in the period of the guard interval GI as shown in FIG. 5A. On the contrary, when the period Δ of the integration executed by the complex correlation calculating circuit 33 is not equal to the period $\Delta_0$ of the guard interval GI, an output of the absolute value circuit 34 does not become not so large as shown in FIG. 5B. In both of the cases, however, the value in the guard interval GI is larger than the value in a period other than the guard interval GI. The reference value of the peak detecting circuit 35 is preset so as to detect the values in both cases shown in FIGS. 5A and 5B.

When a detection signal indicating that the absolute value equal to or larger than the reference value is detected is input from the peak detecting circuit 35, in step S2, the decision circuit 36 sets the present time of the built-in timer at that time to a tp1.

In step S3, a process similar to that of the case in step S1 is executed with respect to the next OFDM symbol. In step S4, a process similar to that of the case in step S2 is executed and a time at which the absolute value equal to or larger than the reference value is detected is set to a tp2.

In step S5, the decision circuit 36 decides whether a difference (tp2−tp1) between the time tp2 obtained in step S4 and the time tp1 obtained in step S2 is a value close to the sum (T+Δ) of the effective symbol length τ and the time Δ in which the integrating process is performed by the complex correlation calculating circuit 33 or not, that is, whether the following expression is satisfied or not.

$$|(tp2-tp1)-(\tau+\Delta n)| \leq R_1 \qquad (2)$$

where $R_1$ denotes a sufficiently small reference value. When the expression (2) is satisfied, it therefore means that the integration period Δ in the complex correlation calculating circuit 33 is almost equal to the period $\Delta_0$ of the guard interval. On the contrary, when the expression (2) is not satisfied, the integration period Δ in the complex correlation calculating circuit 33 is not equal to the period $\Delta_0$ of the guard interval. In this case, the process advances to step S6 where the decision circuit 36 executes a process for allowing the complex correlation calculating circuit 33 to update the integration period Δ. To be specific, as described above, since four kinds of periods of guard intervals of 1/4, 1/8, 1/16, and 1/32are prepared as the period of the guard interval, for example, in the case where Δ is set to a value corresponding to 1/4, Δ is updated to a value corresponding to 1/8. The process is returned to step S1 and similar processes are repeatedly executed.

On the other hand, when it is determined in step S5 that the expression (2) is satisfied, the process advances to step S7 where the decision circuit 36 outputs the value corresponding to the length of the guard interval at that time to the control circuit 21. It is input to the control circuit 21. The control circuit 21 controls the band width of the interpolating filter 9 so as to be corresponded to the length of the input guard interval. When the length of guard interval is long, the band width of the interpolating filter 9 is set to be long. When the length of guard interval is short, the band width of the interpolating filter 9 is set to be short. The band width of the interpolating filter 9 is therefore controlled so as to be the longest when the guard interval is 1/4and to be the shortest when the guard interval is 1/32. The interpolating filter 9 consequently processes only the pilot signals within the necessary minimum range. An influence of excessive signals and noises can be accordingly prevented.

Further, in step S8, the decision circuit 36 sets τ+Δ to the built-in counter so that predetermined clocks are counted. When the count value reaches τ+Δ, a predetermined pulse is allowed to be outputted to the FFT circuit 5. The FFT circuit 5 executes the FFT calculating process to the OFDM signals input from the multipliers 3 and 4 by using the input pulse as a reference (as a window).

On the other hand, the phase detecting circuit 37 calculates a phase error $\tan^{-1}(q/i)$ from the signals i and q and outputs it to the carrier wave generating circuit 7. The carrier wave generating circuit 7 generates a carrier wave in accordance with the input phase error.

Since the other operation is similar to that of the case of FIG. 11, its description will be omitted.

Figure 6:
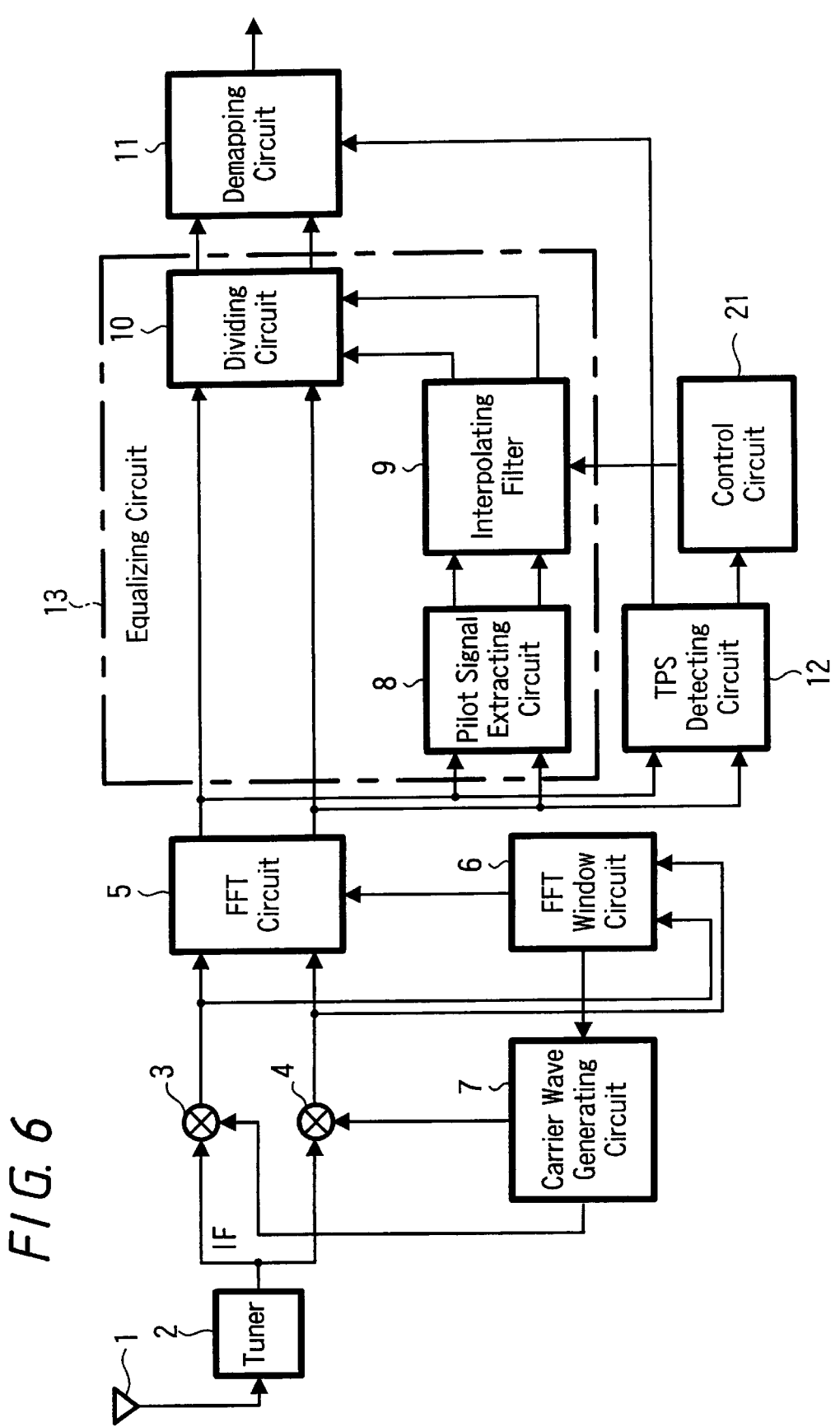
FIG. 6 is a block diagram showing an example of a second embodiment of a signal receiving apparatus of the present invention.

FIG. 6 shows a construction example of a second embodiment. In the construction example, the TPS detecting circuit 12 detects the guard interval information included in the transfer control signal and outputs the detected result to the control circuit 21. Specifically, besides the decoding ratio of the convolutional code and the modulating system of the OFDM carrier wave, the information regarding the guard interval is also included in the transfer control signal. The TPS detecting circuit 12 extracts the information regarding the length of the guard interval from the information regarding the guard interval and outputs it to the control circuit 21. The control circuit 21 controls the interpolating filter 9 in accordance with the input length of the guard interval. In this case as well, effects similar to those of the first embodiment can be produced.

Figure 7:
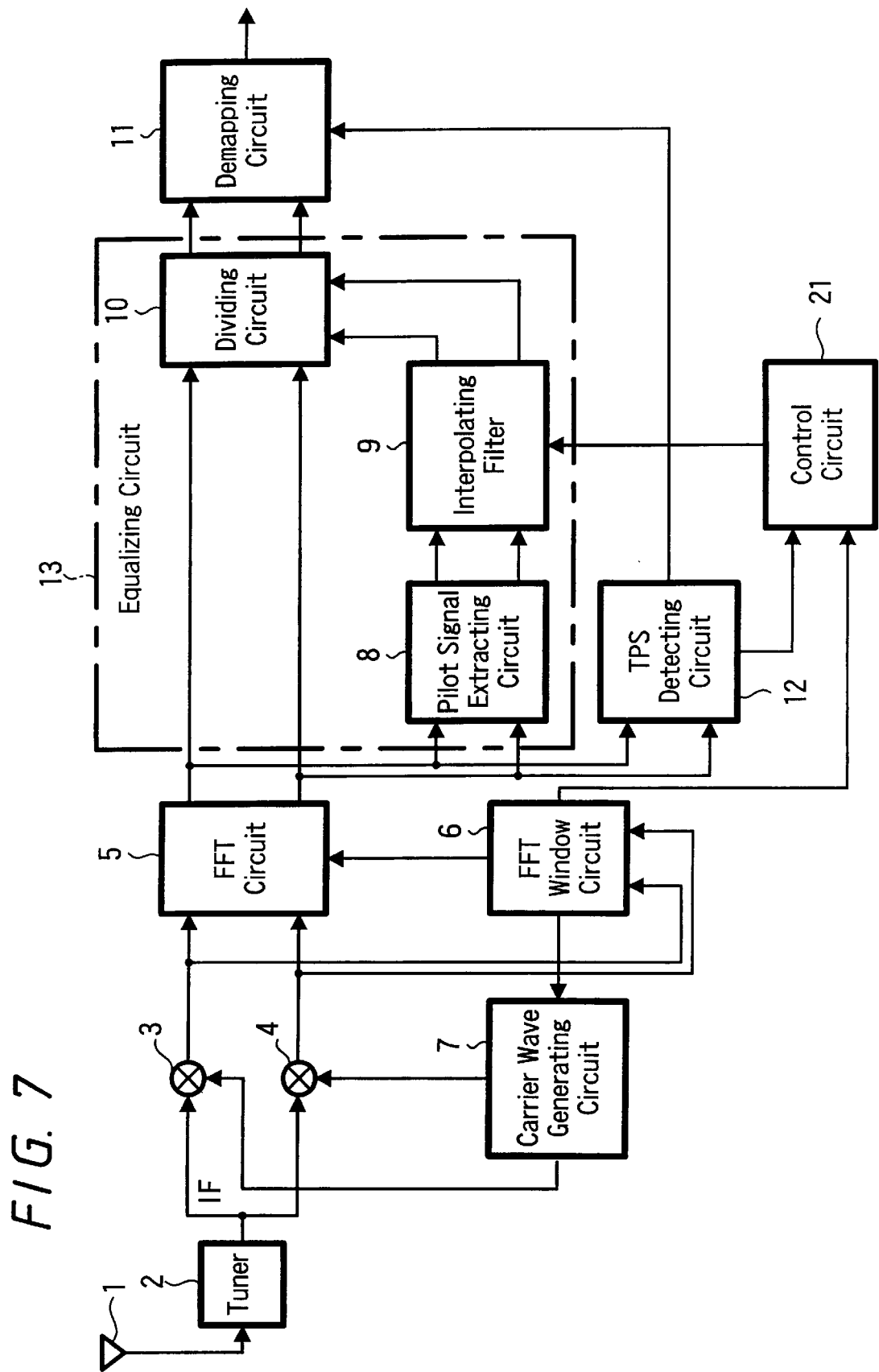
FIG. 7. is a block diagram showing an example of a third embodiment of a signal receiving apparatus of the present invention.

FIG. 7 shows a construction example of a third embodiment. In the construction example, the information of the length of the guard interval detected by the FFT window circuit 6 and the information regarding the length of the guard interval detected by the TPS detecting circuit 12 are supplied to the control circuit 21. The control circuit 21 controls the interpolating filter 9 by using both of the informations regarding the guard interval.

Figure 8:
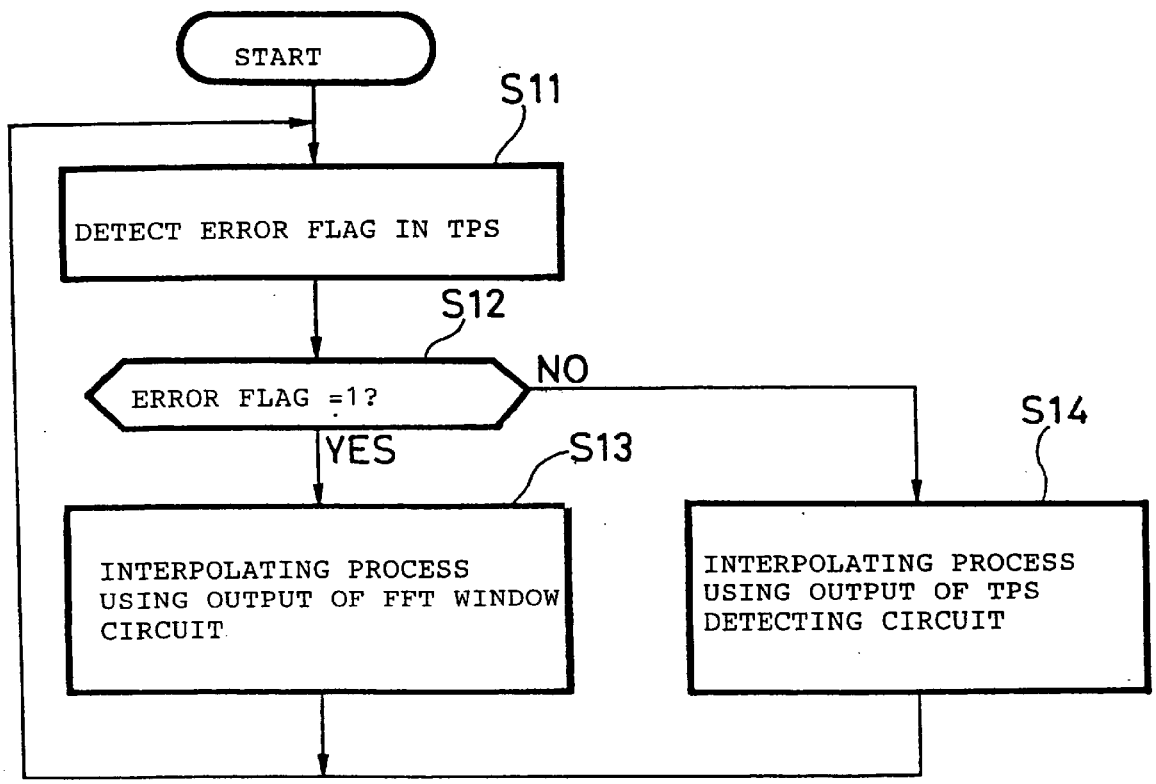
FIG. 8 is a flowchart for explaining the operation of the control circuit shown in FIG. 7.
Figure 9:
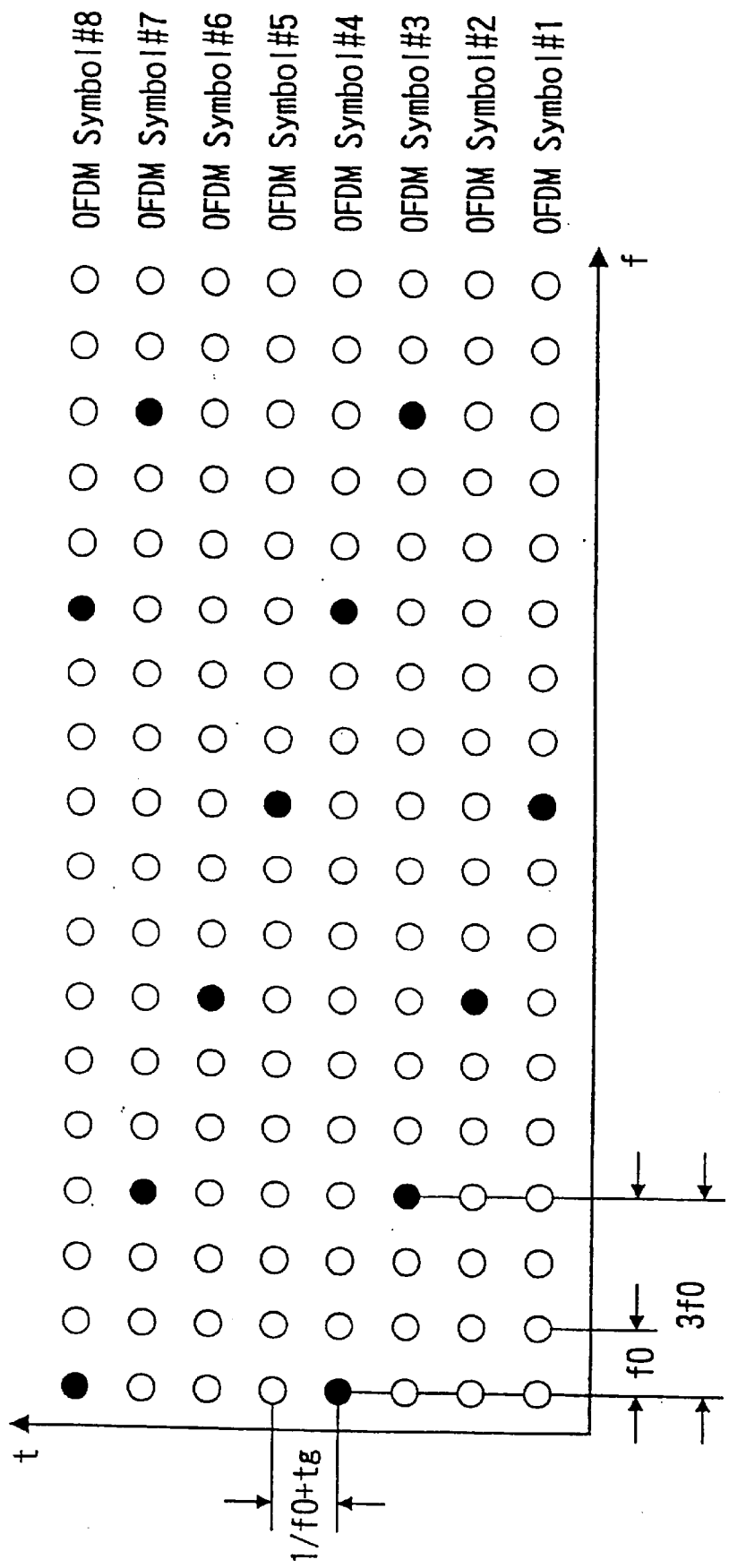
FIG. 9 is a diagram for explaining pilot carrier waves for estimating the transfer characteristics of the DVB-T system.
Figure 10:
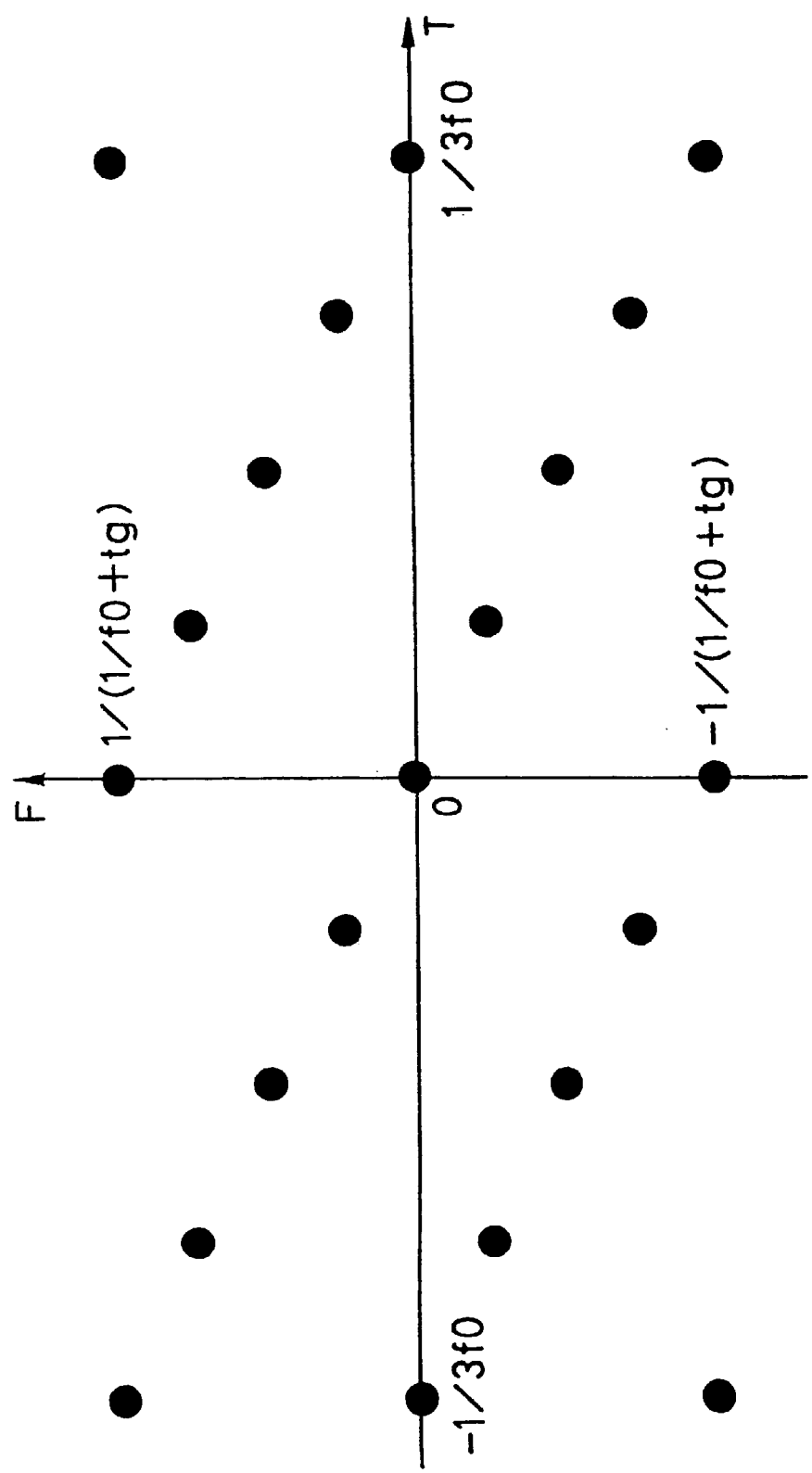
FIG. 10 is a diagram for explaining a lattice structure of samples obtained by performing two-dimensional Fourier transform on the pilot carrier wave.

Specifically, as shown in the flowchart of FIG. 8, first in step S11, the control circuit 21 detects an error flag of the TPS detecting circuit 12. The TPS detecting circuit 12 detects an error of TPS input from the FFT circuit 5, and has therein an error correcting circuit for correcting an error if it exists. When the error is found to be uncorrectable as a result of the error correction, a flag indicating that the error cannot be corrected is outputted to the control circuit 21. The control circuit 21 detects the error flag from the TPS detecting circuit 12 in step S11. In step S12, the control circuit determines whether the error flag is 1 or not, that is, whether there is an uncorrectable error or not.

When it is determined in step S12 that an uncorrectable error exists, the process advances to step S13 where the control circuit 21 controls the band width of the interpolating filter 9 in accordance with the length of the guard interval input from the FFT window circuit 6 without using the information regarding the length of the guard interval supplied from the TPS detecting circuit 12. On the contrary, when it is determined in step S12 that the error flag is not 1 (but is 0) (when it is determined that no uncorrectable error exists), the process advances to step S14 where the control circuit 21 controls the band width of the interpolating filter 9 in accordance with, not the length of the guard interval supplied from the FFT window circuit 6, but the length of the guard interval supplied from the TPS detecting circuit 12.

After the process in step S13 or S14, the process returns to step S11 and the subsequent processes are repeatedly executed.

As mentioned above, in the third embodiment, for example, when an uncorrectable error occurs in the TPS at the time of turning on of the power, switching of channels or the like, the interpolating filter 9 is controlled by using the output of the FFT window circuit 6. In a stationary state, the interpolating filter 9 is controlled in accordance with the length of the guard interval outputted from the TPS detecting circuit 12. Thus, a more accurate control can be executed.

Although the signal receiving apparatus in the DVB-T system of the present invention has been described above as an example, the present invention can be also applied to signal receiving apparatuses of the other systems.

As a providing medium for providing a computer program which performs the process as described above to a user, besides a recording medium such as a magnetic disk, a CD-ROM, a solid memory or the like, a communication medium such as a network, a satellite or the like can be used.

As described above, according to the signal receiving apparatus of the present invention, the signal receiving method of the present invention, and the providing medium of the present invention, the length of the guard interval of the received OFDM signal is detected and the equalizing process is controlled in accordance with the detection result, so that the influence of noises in the transmission path can be more effectively suppressed and the equalizing process can be accurately performed.

What is claimed is:

1. A signal receiving apparatus for receiving a signal transferred in an OFDM system, comprising:

a receiving means for receiving an OFDM signal transferred in the OFDM system;

a demodulating means for demodulating the OFDM signal received by the receiving means;

an equalizing means for equalizing the demodulated OFDM signal;

a detecting means for detecting a length of a guard interval of the OFDM signal received by the receiving means; and a control means for controlling the equalizing means in accordance with a detection result of the detecting means.

2. A signal receiving apparatus according to claim 1, wherein the equalizing means comprises:

an extracting means for extracting a pilot signal included in the signal transferred in the OFDM system;

an interpolating means for interpolating the transfer characteristics of the OFDM signal from a pilot signal extracted by the extracting means; and a dividing means for dividing the demodulated OFDM signal by the transfer characteristics interpolated by the interpolating means.

3. A signal receiving apparatus according to claim 1, wherein the detecting means detects the length of the guard interval by using a correlation of the guard interval.

4. A signal receiving apparatus according to claim 1, wherein the detecting means detects the length of the guard interval from transferred guard interval information included in the OFDM signal.

5. A method for receiving a signal transferred in an OFDM system, comprising:

receiving an OFDM signal transferred in the OFDM system;

demodulating the OFDM signal received in the receiving step;

equalizing the demodulated OFDM signal;

detecting a length of a guard interval of the OFDM signal received in the receiving step; and controlling an equalizing process in the equalizing step in accordance with a detection result in the detecting step.

6. A providing medium recorded with a computer-readable program for receiving a signal transferred in an OFDM system, the program comprising:

receiving an OFDM signal transferred in the OFDM system;

demodulating the OFDM signal received in the receiving step;

equalizing the demodulated OFDM signal;

detecting a length of a guard interval of the OFDM signal received in the receiving step; and controlling an equalizing process in the equalizing step in accordance with a detection result in the detecting step.

* * * * *

UNITED STATES PATENT AND TRADEMARK OFFICE
CERTIFICATE OF CORRECTION

PATENT NO.   : 6,449,245 B1  Page 1 of 1
DATED        : September 10, 2002
INVENTOR(S)  : Yasunari Ikeda and Takahiro Okada It is certified that error appears in the above-identified patent and that said Letters Patent is hereby corrected as shown below:

Column 4,
Line 3, "the, longest," should read -- the longest, --.

Column 7,
Line 1, "T" should be -- $\tau$ --.

Signed and Sealed this

Twenty-eighth Day of January, 2003

JAMES E. ROGAN
*Director of the United States Patent and Trademark Office*